United States Patent

[11] 3,632,973

[72] Inventor James Edward O'Keefe
 Phoenix, Ariz.
[21] Appl. No. 42,389
[22] Filed June 1, 1970
[45] Patented Jan. 4, 1972
[73] Assignee Honeywell Information Systems Inc.

[54] SOLDERING TOOL FOR REMOVAL AND REPLACEMENT OF COMPONENTS HAVING MULTIPLE SOLDERED JUNCTIONS
6 Claims, 6 Drawing Figs.

[52] U.S. Cl..................................... 219/230,
 29/203 H, 29/278, 145/52, 219/228, 228/51
[51] Int. Cl........................................ H01r 43/02,
 B23k 3/00, H05b 1/00
[50] Field of Search........................ 219/221–242,
 85, 158, 161; 228/51–55, 57, 19, 20;
 145/52; 29/203 H, 268, 278

[56] References Cited
 UNITED STATES PATENTS

| | | | |
|---|---|---|---|
| 3,529,760 | 9/1970 | Hickman et al............... | 219/229 X |
| 3,230,338 | 1/1966 | Kawecki....................... | 219/229 X |
| 2,512,426 | 6/1950 | Hartley......................... | 219/85 X |
| 1,240,138 | 9/1917 | Haufe............................ | 145/52 |
| 2,448,182 | 8/1948 | Kalfen.......................... | 219/229 |
| 1,439,593 | 12/1922 | Wilson ......................... | 145/52 |
| 2,056,256 | 10/1936 | Conklin........................ | 145/52 |
| 703,638 | 7/1902 | Campbell et al.............. | 145/52 |
| 3,130,286 | 4/1964 | Lenzi............................ | 219/233 |
| 2,751,485 | 6/1956 | Sauer ........................... | 219/230 X |
| 3,339,059 | 8/1967 | Spinka......................... | 219/227 X |

FOREIGN PATENTS

| | | | |
|---|---|---|---|
| 1,564,832 | 3/1969 | France ......................... | 219/228 |
| 300,162 | 3/1955 | Switzerland.................. | 219/233 |

Primary Examiner—A. Bartis
Attorneys—Edward W. Hughes and Fred Jacob

ABSTRACT: The soldering tool provides a working tip formed to contact the multiple pins of an integrated circuit. The working tip can be in the form of a channel to contact the outside of the pins for integrated circuits soldered in printed circuits boards. The working tip may also be a rectangular block partially chamfered for contacting the inside of an inverted integrated circuit for soldering or desoldering the integrated circuit from a printed circuit containing rows of pins. Biased clamping jaws are slidably fastened to the soldering tool for gripping the integrated circuit to bring the working bit into and out of contact with the plurality of solder junctions on the integrated circuit without releasing the clamping jaws.

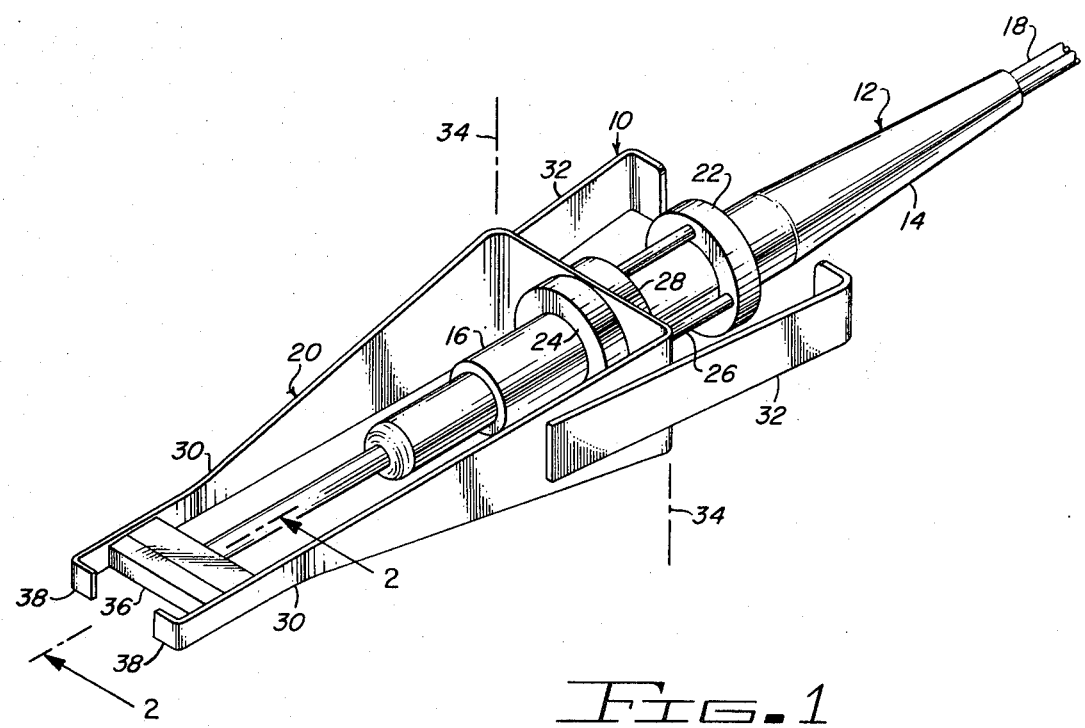
FIG.1
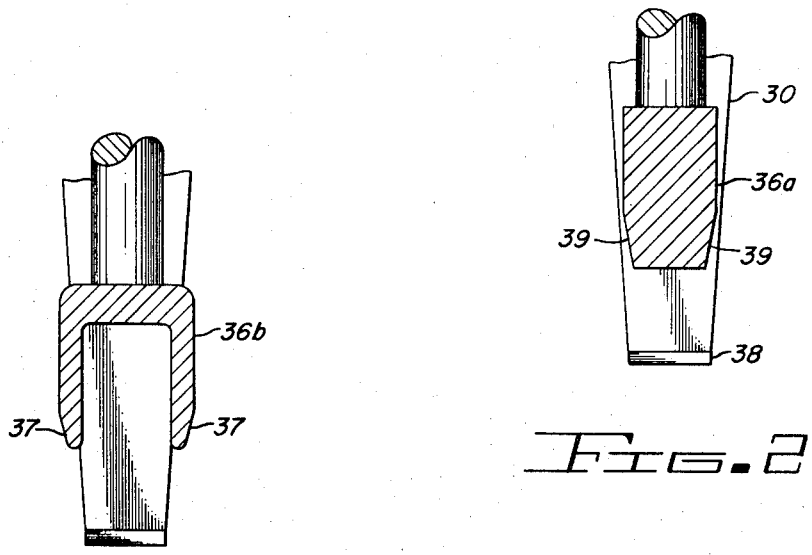
FIG.3
FIG.2
INVENTOR.
JAMES E. O'KEEFE
BY
James U. Bershon
ATTORNEY

SOLDERING TOOL FOR REMOVAL AND REPLACEMENT OF COMPONENTS HAVING MULTIPLE SOLDERED JUNCTIONS

BACKGROUND OF THE INVENTION

This invention relates generally to soldering tools and more specifically to a tool for soldering and desoldering an item having multiple soldered junction points.

Soldering tools have long been in use especially since the advent of electricity and the electronic arts. Most prior art soldering tools heated only one element of a device at one time. This causes problems especially in removing a multiple junction item such as an integrated circuit element from a printed circuit board. Heating the individual connections require that some means be provided to prevent the reconnection or resoldering of the joint when the soldering tool was removed. For this purpose an attachment was placed onto the soldering tool which either by a discharge of air or by providing a vacuum, the solder from the junction was removed. The solder removing attachments however still require that each element be individually heated in order to melt the solder alloy.

When an item or component such as an integrated circuit has been soldered onto a printed circuit board, it is often required to separate the component without damaging either the component or the printed circuit board. The difficulty is particularly acute where the component is soldered to the printed circuit board pads at a multiple of junctions and the component is very delicate. The prior art attempted to remove integrated circuits from a printed circuit by heating the printed circuit on the side opposite the mounted integrated circuits. This operation required two operators, one to apply the heat, the other to remove or replace the integrated circuit. Damage could still result to the printed circuit board because of the uneven contact area to which the heat must be applied.

SUMMARY OF THE INVENTION

The soldering tool of the present invention comprises a means for heating a working bit formed to contact a multiple of soldered junctions at one time. A clasping element is slideably fastened to the soldering tool in order to grip and remove a component after the solder is melted at all of the junctions.

A standard soldering iron has a special working tip fastened to the heating element and formed either is a substantially rectangular block form having partially chamfered sides for contacting the inner sides of the multiple junctions of the integrated circuit or shaped in the form of a channel for contacting the outer surfaces of the multiple pins of the integrated circuit. Clamping jaws are biased inwardly and placed adjacent to the working tip for gripping the integrated circuit. The clamping jaws are slidably fastened to the handle of the soldering tool away from the heating element for providing a gripping action to the integrated circuit while sliding the clamping jaws on a longitudinal axis to said handle to bring the integrated circuit into and out of contact with the working bit without releasing the clamping action. Extension arms are fastened to the clamping arms to provide a lever action to overcome the bias action of the inwardly biased clamping arms.

It is, therefore, a primary object of the invention to provide a soldering tool for removing a component having a plurality of soldered junctions.

Another object of the invention is to provide an enhanced soldering tool.

Yet another object is to provide a novel apparatus for soldering and desoldering integrated circuits from a printed circuit board.

Still another object of the invention is to provide a soldering bit formed to melt the solder of a plurality of soldered junctions of a component at one time and grip the component at the same time.

BRIEF DESCRIPTION OF THE DRAWING

Further features and a more specific description of illustrated embodiments of the invention are presented herein after with reference to the accompanying drawing, wherein:

FIG. 1 is a perspective view of a soldering tool of the present invention;

FIG. 2 is an enlarged fragmented cross section on line 2—2 of FIG. 1 showing an embodiment of a working bit for use with the soldering tool of the present invention;

FIG. 3 is an enlarged fragmented cross section of another embodiment of a working bit from a similar cross section on line 2—2 of FIG. 1;

DESCRIPTION OF THE PREFERRED EMBODIMENT

Figure 5:
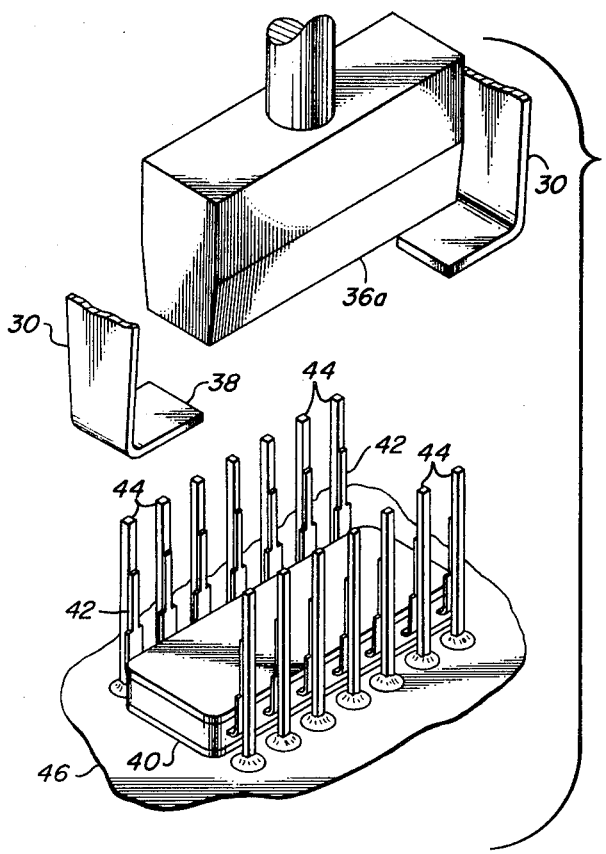
FIG. 5 is a fragmented exploded perspective view of the working bit embodiment of FIG. 2 in position for operation on an inverted integrated circuit.

With reference to the drawing, in FIG. 1 the soldering and desoldering tool apparatus 10 os the present invention is shown including a soldering iron 12 comprising a handle or holder 14 enclosing a heating element 16. The heating element 16 is attached internally to a cord 18 which leads to an electrical power source, not shown. A clamp or extractor 20 made of a resilient material such as spring steel is shown formed in a U-shape and slideably fastened to the handle 12 between two yokes 22 and 24. Guide pins 26 are fastened between the yoke 22 and yoke 24. A spacer 28 is fastened to the clamp 20 at the center of the V-shape. The spacer 28 permits the clamp 20 to slide along the guide pins 26 between the yoke 22 and yoke 24. The two yokes are rigidly fastened to the handle 14. The clamp 20 includes clamping or extractor jaws 30. Two extension arms 32 are fastened to the clamp 20 on each side. The extension arms 32 extend beyond a pivot point 34 and are positioned adjacent to the holder 14. The extension arms 32 are used to overcome the bias force of the resilient material of the clamp 20 in order to spread the clamping jaws 30 in an outward manner as will be explained later. A working tip or bit 36 is threaded or otherwise fastened to the heating element 16 for easy removal and replacement. The handle 14 along with the heating element 16 form the conventional soldering iron 12 of a type well known. The working tip 36 is formed of a material having good thermal conductivity, such as copper, in order to conduct the heat produced by the heating element 16 into a working surface. The clamping jaws 30 are formed at an end adjacent to the working tip 36 to form tangs 38 used to grip a component for removal after reflow of the solder. It is obvious that a second tang could be formed adjacent to the tang 38 shown on each clamping jaw 30 in order to securely hold a component between the first and second tang of each clamping jaw 30.

Two embodiments of a working tip are shown in FIGS. 2 and 3. The working tip 36a of FIG. 2 has a slight chamfer 38 formed on two sides in order to position the working tip 36a between junction pins of an inverted integrated circuit as shown in FIG. 5. FIG. 5 shows an integrated circuit 40 in an inverted position with a plurality of pins 42 of the integrated circuit 40 fastened to a plurality of wire-wrap pins 44 of, typically, printed circuit board 46. The tangs 38 of the extractor jaws 30 are shown in position for contacting the integrated circuit 40 while the working tip 36a of FIG. 2 is positioned for contacting the pins 42 of the integrated circuit 40 and the wire-wrap pins 44 for either melting the solder in order to remove the integrated circuit 40 or for heating the pins in order to allow the flow of solder to connect the pretinned pins 44 of the printed circuit board 46 to the multiple junction pretinned pins 42 of the integrated circuit 40. The operation of the soldering tool will be explained in more detail later.

Figure 6:
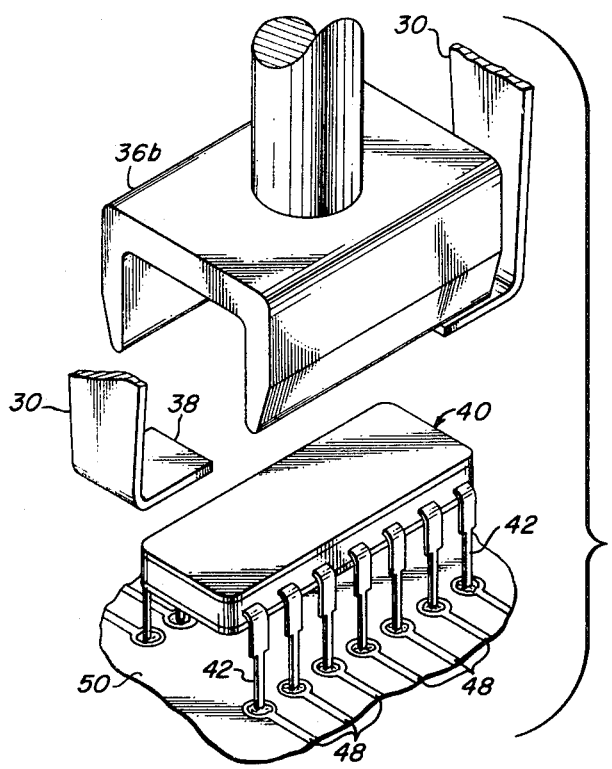
FIG. 6 is a fragmented exploded perspective view of the working bit embodiment of FIG. 3 is position for operation on an integrated circuit mounted to a printed circuit board.

Referring now to FIGS. 3 and 6 for a second embodiment of working tip for use with the soldering tool of the present invention. In FIG. 3 a working tip 36b is shown in the form of an inverted U-channel in order to contact the plurality of pins 42 of an integrated circuit 40 positioned in an upright position as shown in FIG. 6. The working tip 36b is shown chamfered at places 37 to provide a minimum heated surface area contact to a printed circuit board. A dimension of thirty to fifty thousandths of an inch is typical for the points of the channel working tip with the thickness of the channel being a typical one-hundred thousandths of an inch.

In FIG. 6 the tangs 38 of the extractor jaws 30 are again shown in position for contacting the integrated circuit body. The plurality of junction pins 42 of the integrated circuit 40 are shown in FIG. 6 in position for contacting a plurality of conductive runs 48 on a printed circuit board 50. In an operation that will be explained in more detail later, the tangs 38 of the clamping or extractor jaws 30 contact the integrated circuit 40 to hold it in position and the working tip 36b is slideably moved downward to contact all of the plurality of pins 42 of the integrated circuit 40 at one time in order to permit the soldering of the plurality of pins 42 into position onto the conductive runs 48 at the same time. The channel form of the working tip 36b also permits the desoldering of the integrated circuit 40 by applying heat to the plurality of pins 42 of the integrated circuit 40 and melting all of the solder junctions between the pins 42 of the integrated circuit 40 and the runs 48 of the printed circuit board 50 at the same time, thereby permitting the easy removal or insertion of an integrated circuit onto a printed circuit board without damage to either.

Figure 4:
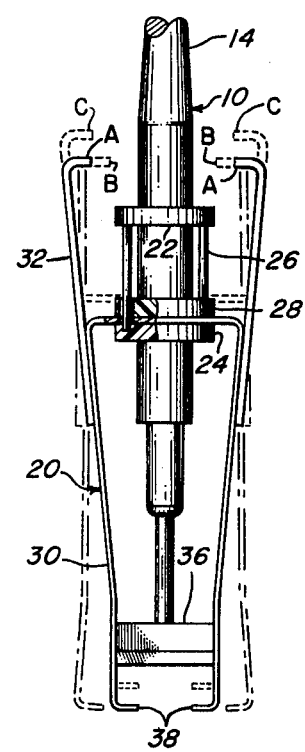
FIG. 4 is a fragmented side elevation of the soldering tool according to the present invention showing the working arrangements of the apparatus.

In FIG. 4 a side view of the soldering tool 10 is shown to illustrate the sliding action of the clamp 20 as well as the opening and closing of the clamping jaws 30 into and out of a clamping position. Position A of the soldering tool 10 of FIG. 4 is shown by the solid lines of the elements and shows the tool 10 at a ready or rest position. The clamping jaws 30 are in a clamped position from the biasing of the resilient material used to make the clamping jaws. In position A the clamping jaws 30 are in a clamping position. A cutaway section of the spacer 28, the clamp 20 and the yoke 24 shows the slideable mounting of the spacer 28 and the clamp 20 along the guide pins 26 fastened to the yoke. As started previously the two yokes 22 and 24 are rigidly fastened to the handle 14 of the soldering tool 10.

In position B shown by the dashed lines of the elements, the extension arm 32 fastened to the clamp 20 is depressed inwardly towards the handle 14 of the soldering tool. The extension arms 32 must be depressed sufficiently to overcome the bias of the clamp 20 around the pivot point formed by the U-shaped clamp. The position of the clamping jaws 30 and the extension arms 32 are shown in dashed lines.

In position C the clamp 20 is shown after being moved in a sliding motion along the guide pins 26 such that the spacer 28 contacts the upper yoke 22 as shown in FIG. 4. In position C the tangs 38 of the clamping jaws 30 are retracted in the direction of the working tip 36. In position C the working or soldering tip 36 comes into contact with the multiple junctions in order to accomplish the soldering or desoldering of the item in one motion.

The operation of the soldering tool can best be described by referring to FIGS. 1, 4 and 5 to describe the removal of the inverted integrated circuit 40. It is, of course, obvious that the same operation could be used for placement of an inverted integrated circuit as well as the placement and removal of an integrated circuit having its junction pins facing away from the soldering tool such as shown in FIG. 6.

As a first step, an electrical power must be applied to the heating element 16 via the line cord 18 in order to allow the working tip 36 to reach a temperature such that solder will flow. The extractor or clamping jaws 30 should be in position A as shown in FIG. 4, that is, the clamping jaws 30 should be at a rest position. The tangs 38 of the clamping jaws are positioned away from the working tip 36. The soldering tool 10 should then be positioned above the device to be removed such as the integrated circuit 40 as shown in FIG. 5. The clamping jaws 30 are then opened from a clamping position by applying pressure onto the extension arms 32 in a direction towards the handle 14 soldering iron. Applying pressure to the extension arms 32 allows the clamping jaws 30 to be placed into position B of FIG. 4 in order to span the length or long dimension of the integrated circuit 40 as shown in FIG. 5. The soldering tool is lowered to position the tangs 38 of the clamping jaws 30 under the body of the integrated circuit 40. The pressure placed onto the extension arm 32 is then released. The tangs 38 thereby grip underneath the body of the integrated circuit 40. The soldering tool will be again in position A as shown in FIG. 4. At this time the working tip 36 will not come into contact with the pin leads 42 of the integrated circuit nor the wire-wrap pins 44 of the printed circuit board 46.

With the tangs 38 of the extractor jaws 30 in position under the integrated circuit device, the working tip 36 is slid into contact with the pins of the integrated circuit device by sliding the handle of the soldering tool in a downward motion. At this time the soldering tool will be in position C as shown in FIG. 4. Upon the melting of all of the plurality of pins of the integrated circuit, the soldering tool can be lifted upward to permit the removal of the integrated circuit. The clamp 20 can then be slid forward and pressure can be applied to the extension arm 32 to place the soldering tool into position B for releasing the integrated circuit device.

Thus what has been shown is a soldering tool for removal and replacement of a device having a plurality of soldered junctions. The solder of the plurality of soldered junctions is melted at one time in order to permit the easy removal or replacement of the device. It is, of course, obvious that other devices than integrated circuits can be used with the soldering tool as shown and also, by merely changing the head configuration of the working tip, many different types of devices such as printed circuit resistors and capacitors, as well as printed circuit semiconductor sockets can be soldered and desoldered using the tool of the present invention. The use of a spring steel for the extractor is not to be taken as limiting the invention for it is obvious that a spring could be mounted either between the jaws or around the jaws to provide the necessary clamping action.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, with the limits only of the true spirit and scope of the invention.

I claim:

1. A soldering tool for soldering a component to a printed circuit board at a plurality of junctions comprising:
   a handle;
   a heating element within said handle capable of providing sufficient heat to melt solder;
   a working bit heated by said heating element and shaped to contact the plurality of solder junctions of the component at one time; and
   an extractor including clamping jaws formed to clasp the component adjacent to said working bit, biasing means for urging said clamping jaws towards each other, and a pair of lever extension arms fastened to said clamping jaws for easily overcoming said biasing means, said extractor fastened to said handle for slidable motion along the longitudinal axis of said handle to bring the plurality of solder junctions of said component into and out of contact with said working bit without releasing said clamping jaws.

2. The soldering tool of claim 1 wherein said working bit is shaped in a substantially rectangular block form partially chamfered on the portion of the working bit contacting said plurality of junctions.

3. The soldering tool of claim 1 wherein said working bit is shaped in the form of a channel to contact the plurality of junctions of the integrated circuit within the channel form.

4. In a soldering tool for soldering a component to a printed circuit board at a plurality of junctions, said soldering tool including a handle and a heating element within the handle capable of providing sufficient heat to melt solder, the improvement comprising:
   a working bit heated by the heating element and shaped to contact the plurality of solder junctions of the component at one time;
   an extractor including clamping jaws formed to clasp the component adjacent to said working bit, biasing means for urging said clamping jaws toward each other, and a pair of lever extension arms fastened to said clamping jaws for easily overcoming said biasing means;
   a pair of yokes fastened to the handle and spaced a distance apart;
   at least one guide pin fastened between said yokes; and
   a spacer fastened to said extractor and slidable along said guide pin along an axis longitudinal to the axis of said handle;
   said yokes, guide pin and spacer defining the longitudinal travel of said extractor such that that the plurality of solder junctions of said component is brought into and out of contact with said working bit without releasing said clamping jaws.

5. The soldering tool of claim 4 wherein said working bit is shaped in a substantially rectangular block form partially chamfered on the portion of the working bit contacting said plurality of junctions.

6. The soldering tool of claim 4 wherein said working bit is shaped in the form of a channel to contact the plurality of junctions of the the component within the channel form.

* * * * *